(12) United States Patent
Piazza et al.

(10) Patent No.: US 9,741,154 B2
(45) Date of Patent: Aug. 22, 2017

(54) RECORDING THE RESULTS OF VISIBILITY TESTS AT THE INPUT GEOMETRY OBJECT GRANULARITY

(71) Applicant: Intel Corporation, Santa Clara, CA (US)

(72) Inventors: Thomas A. Piazza, Granite Bay, CA (US); Bimal Poddar, El Dorado Hills, CA (US); Peter L. Doyle, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 13/682,967

(22) Filed: Nov. 21, 2012

(65) Prior Publication Data

US 2014/0139512 A1    May 22, 2014

(51) Int. Cl.
*G06T 15/00* (2011.01)
*G06T 15/40* (2011.01)

(52) U.S. Cl.
CPC ............ *G06T 15/005* (2013.01); *G06T 15/40* (2013.01)

(58) Field of Classification Search
CPC ..... G06T 15/005; G06T 15/40; G06T 15/405; G06T 2207/20021; G06T 2210/52; G06T 15/08; G09G 2360/122; G09G 5/363; G09G 2360/12

See application file for complete search history.

(56) References Cited

U.S. PATENT DOCUMENTS

| | | | |
|---|---|---|---|
| 6,268,875 B1 | 7/2001 | Duluk | |
| 6,646,639 B1* | 11/2003 | Greene et al. | ............... 345/422 |
| 7,023,437 B1* | 4/2006 | Voorhies | ............... G06T 15/005 |
| | | | 345/419 |
| 8,189,007 B2 | 5/2012 | Kim | |
| 8,203,564 B2 | 6/2012 | Jiao | |
| 8,207,975 B1 | 6/2012 | Molnar et al. | |
| 8,525,843 B2 | 9/2013 | Falchetto | |
| 2003/0025695 A1* | 2/2003 | Morphet | ....................... 345/423 |
| 2006/0082593 A1 | 4/2006 | Stevenson | |
| 2009/0027383 A1* | 1/2009 | Bakalash | .............. G06F 9/5044 |
| | | | 345/419 |
| 2010/0060630 A1* | 3/2010 | Nystad | .................... G06T 15/40 |
| | | | 345/419 |

(Continued)

FOREIGN PATENT DOCUMENTS

CN    101639929 A    2/2010
TW       588289 B    5/2004

(Continued)

OTHER PUBLICATIONS

PCT International Search Report and Written Opinion issued in corresponding PCT/US2013/048062 dated Oct. 18, 2013, (10 pages).

(Continued)

*Primary Examiner* — Haixia Du
(74) *Attorney, Agent, or Firm* — Trop Pruner & Hu, P.C.

(57) ABSTRACT

According to some embodiments of the present invention, pixel throughput may be improved by performing depth tests and recording the results on the granularity of an input geometry object. An input geometry object is any object within the depiction represented by a primitive, such as a triangle within an input triangle list or a patch within an input patch list.

18 Claims, 4 Drawing Sheets

(56) References Cited

U.S. PATENT DOCUMENTS

2013/0241938 A1* 9/2013 Gruber et al. ............... 345/501

FOREIGN PATENT DOCUMENTS

TW          I283835      3/2007
TW      201137786 A    11/2011

OTHER PUBLICATIONS

TW Search Report issued in corresponding TW application No. 102142056 dated May 27, 2015 [w/English translation] (2 pages).
International Preliminary Report on Patentability filed in corresponding PCT application No. PCT/US2013/048062 dated Jun. 4, 2015.
Taiwan office action in corresponding TW application No. 102142056 dated Dec. 31, 2015.
CN office action issued in corresponding CN application No. 201380055074.9 dated Apr. 26, 2017 (9 pages) [no English tanslation].

* cited by examiner

RECORDING THE RESULTS OF VISIBILITY TESTS AT THE INPUT GEOMETRY OBJECT GRANULARITY

BACKGROUND

This relates generally to graphics processing.

In graphics processing, performance is largely a function of pixel computation throughput and/or memory bandwidth limitations, especially in low power consuming devices.

Thus many techniques have been developed to reduce the amount of pixel computations that need to be performed, especially on pixels that are ultimately not visible in the final depiction due to occlusion by other scene objects. For example, early depth or Z culling first performs an occlusion or depth test for a pixel and then only computes the pixel if the pixel is visible. In deferred rendering, an application performing a rendering pass actually only performs the depth test to see if the pixels are visible. This depth test rendering pass results in a depth buffer being populated with information used in a second rendering pass where only the ultimately visible pixels are computed.

In tile-based deferred rendering, a scene image is divided into rectangular tile regions and rendered incrementally by tile regions. The tile regions are sized relative to memory cache capability so that the color and depth buffer for a tile region can be contained within the cache.

While these techniques have resulted in improvements, it is desirable to reduce pixel computation burden and unnecessary replication of geometry processing in graphics processing engines.

BRIEF DESCRIPTION OF THE DRAWINGS

Some embodiments are described with respect to the following figures.

DETAILED DESCRIPTION

Figure 1:
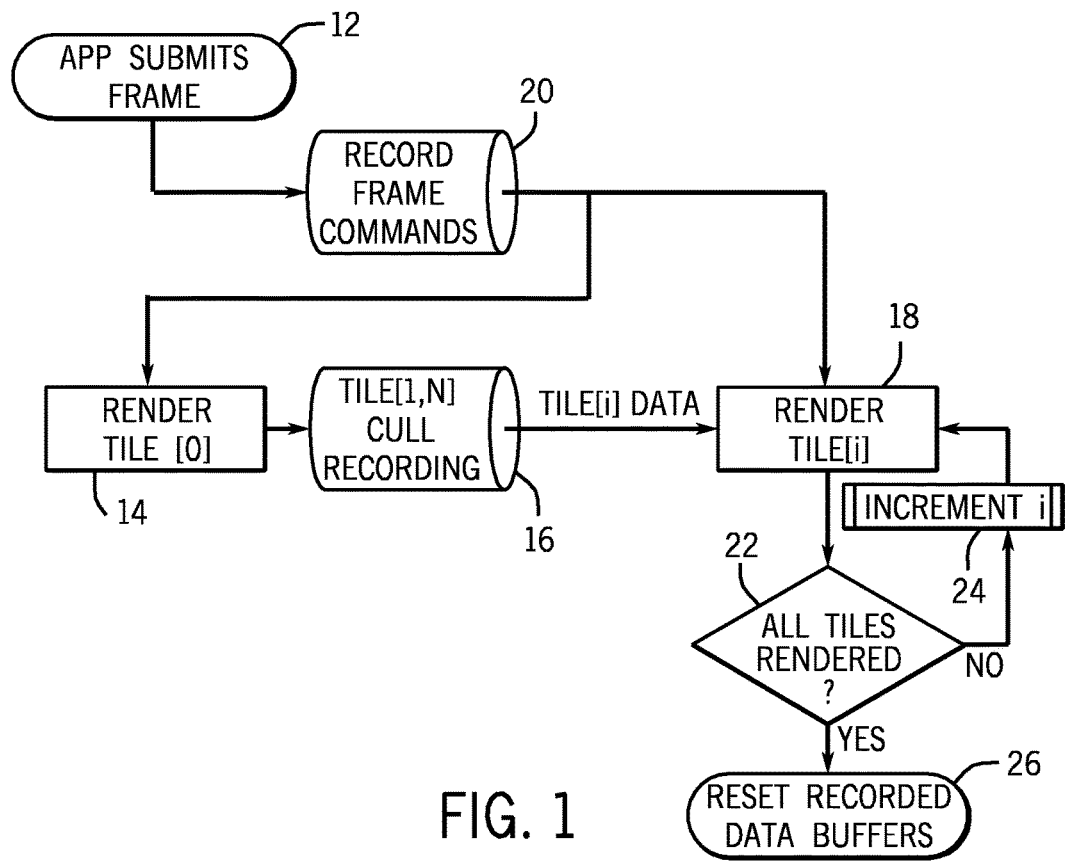
FIG. 1 is a flow chart for a tile-based deferred rendering sequence according to one embodiment to the present invention.

According to some embodiments of the present invention, pixel throughput may be improved by performing depth tests and recording the results on the granularity of an input geometry object. An input geometry object is any object within the depiction represented by a primitive, such as a triangle within an input triangle list or a patch within an input patch list.

In some embodiments redundant geometry processing may be reduced and visibility tests may be performed during an initial rendering pass. Then the results of these tests may be recorded in memory buffers to eliminate unnecessary re-processing of that input geometry object during subsequent rendering passes.

In some embodiments per object visibility results may be supported by enhancing the geometry pipeline to carry markers that delimit results from individual input geometry objects as well as delimiting individual instances within draw commands.

Two different types of visibility information may be recorded in some embodiments. First, information about objects that were culled may be recorded. An object is considered culled by the pipeline for example, due to clip trivial reject, backface culling or any other reason. Thus, the information that the object is considered culled may be recorded in some embodiments.

In other embodiments, the information that an object that was not culled but is not relevant to final rendering can be recorded as well. As an example, an object may not be culled but it may fail the early depth test and as a result will not generate any pixels for rendering. Additionally, objects that are not occluded may still not generate any output. An example would be very small sliver-shaped triangles that do not cover any samples. Even though the sliver triangles may not be totally occluded, they will necessarily not appear in the final depiction.

While any visibility test may be used, in some embodiments of the present invention, the results may be initially computed on a per input geometry object basis. If an object is visible with respect to some desired criteria, the visibility result is recorded as being visible. Thus a particular bit may be assigned to all those primitives that are considered visible.

An algorithm may then be applied to compress the visibility test results for some very typical conditions. Examples of such typical conditions include long runs of completely visible or completely non-visible objects, or cases where an entire instance within a primitive command is completely visible or completely non-visible in other cases. The compressed stream may then be written to a memory buffer.

Cull and/or occlusion recording buffers can be subsequently input by a vertex fetch stage within the pipeline for use during the rendering pass. Objects or instances that are marked "not visible" by at least one buffer are skipped over by the vertex fetch stage, subject to some exceptions. As the visibility information is specific to vertex fetch input objects and instances, tessellation and geometry shading in addition to simple vertex shader or pixel shader workloads may be supported.

According to some embodiments, a deferred rendering system capability may be augmented by adding support for tile based deferred rendering and/or deferred rendering depth passes. In both cases, a command stream for a frame is recorded during an initial rendering pass for use in subsequent rendering passes as indicated for example, at FIG. 1 at 20. In the embodiment shown in FIG. 1, a tile-based deferred rendering embodiment is depicted. Thus, initially an application submits the frame to be rendered as indicated in block 12. During the rendering of the first tile rectangle (tile [0]), as indicated at block 14, information is recorded as to the visibility of input geometry objects in each of the other tile rectangles, as indicated in block 16. The information (TILE(i) DATA) recorded at block 16 is then used during the rendering of those tiles at block 18. As a result, input geometry objects detected as not visible within the specific tile rectangle may be skipped over during the rendering at block 18.

The visibility information may be recorded only once for tiles, [1 . . . N] while tile [0] is being rendered. Therefore only set-up generated two-dimensional cull testing may be performed and recorded for tiles, [1 . . . N] in some embodiments. After rendering tiles, a check at diamond 22 determines whether all tiles have been rendered, and if not, a variable i is incremented to get the next tile for rendering. Once all the tiles have been rendered, the recorded data buffers may be reset, as indicated 26.

Figure 2:
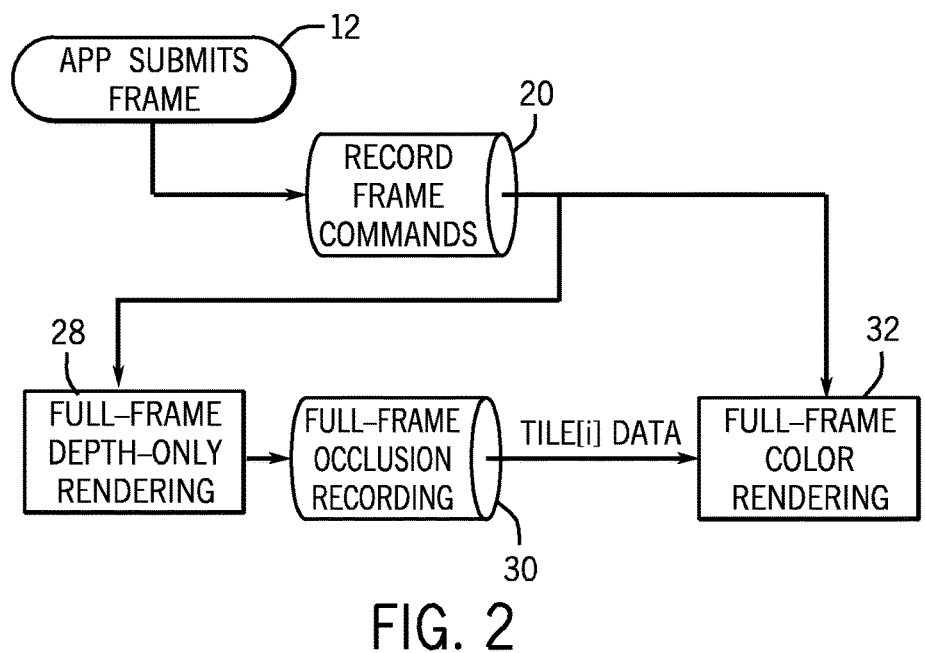
FIG. 2 is a flow chart for a deferred rendering depth pass sequence according to another embodiment to the present invention.

In accordance with a deferred rendering depth pass embodiment, shown in FIG. 2, the application submits the frame as indicated at 12 and the frame commands are recorded at 20, as described previously. The deferred rendering depth pass first performs a depth only rendering pass over the entire frame of interest by generating a depth buffer for use in subsequent color rendering passes as indicated in block 28. During the initial depth only pass, occlusion (post-early-Z), visibility information for all submitted geometry objects is recorded at block 30. If a single, full frame color rendering is desired, the recorded full frame occlusion visibility information is used to send to the full frame color rendering block 32 and is used to skip over objects that did not survive early Z or were otherwise culled.

Figure 3:
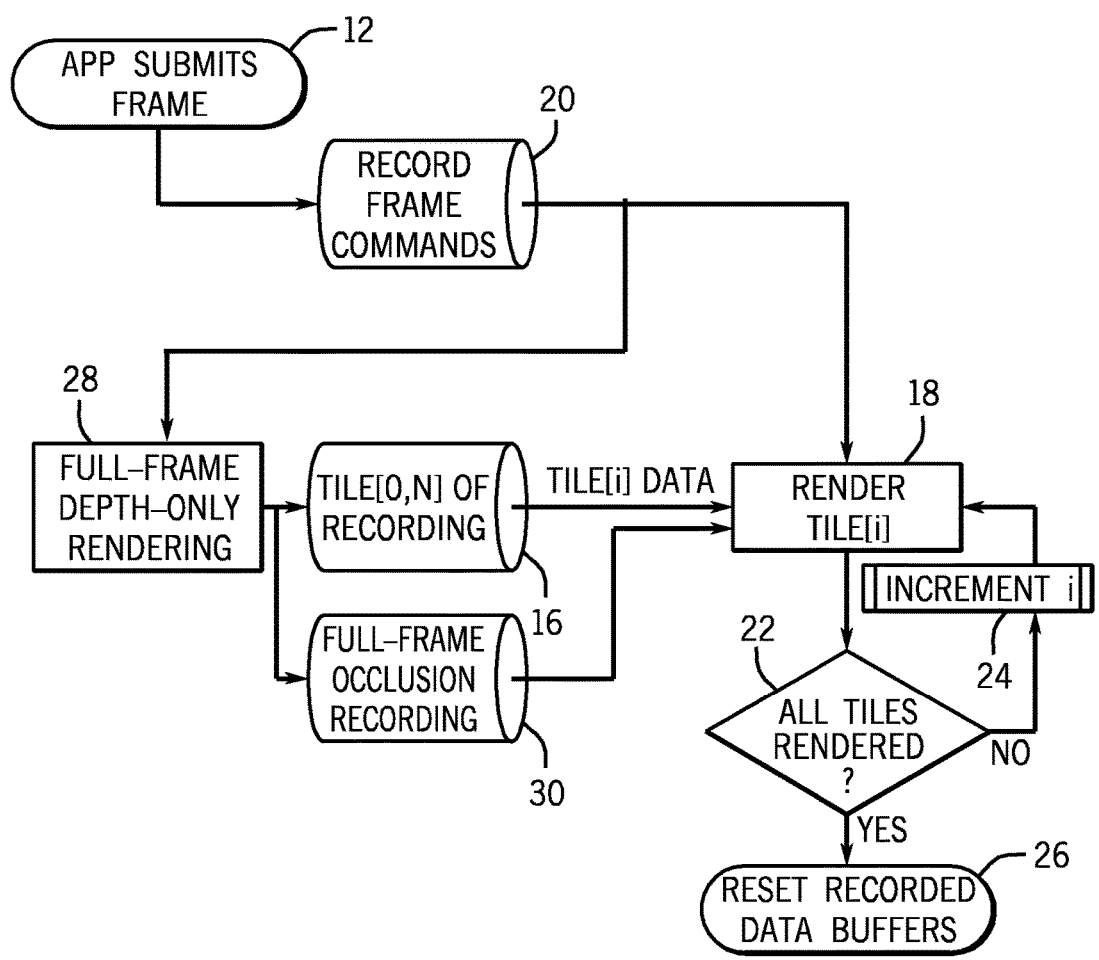
FIG. 3 is a flow chart for another tile-based deferred rendering process according to one embodiment to the present invention.

Finally if tile-based deferred rendering is to be used to perform the full rendering, as indicated in FIG. 3, cull information for all tiles is recorded during the depth only pass, as indicated in block 16. For each subsequent tile rendering pass, both the full frame occlusion information at 30 and the tile specific cull information from block 16 is used to skip over objects deemed not visible at the rendering block 18. The sequence is otherwise the same as the sequence of FIG. 1.

The sequences of FIGS. 1 to 3 may be implemented in software, firmware and/or hardware. In software and/or firmware embodiments the sequences may be implemented by computer executed instructions stored in one or more non-transitory computer readable media such as a magnetic, semiconductor or optical storage. That storage for example may be part of or coupled to a graphics processing unit in one embodiment.

Figure 4:
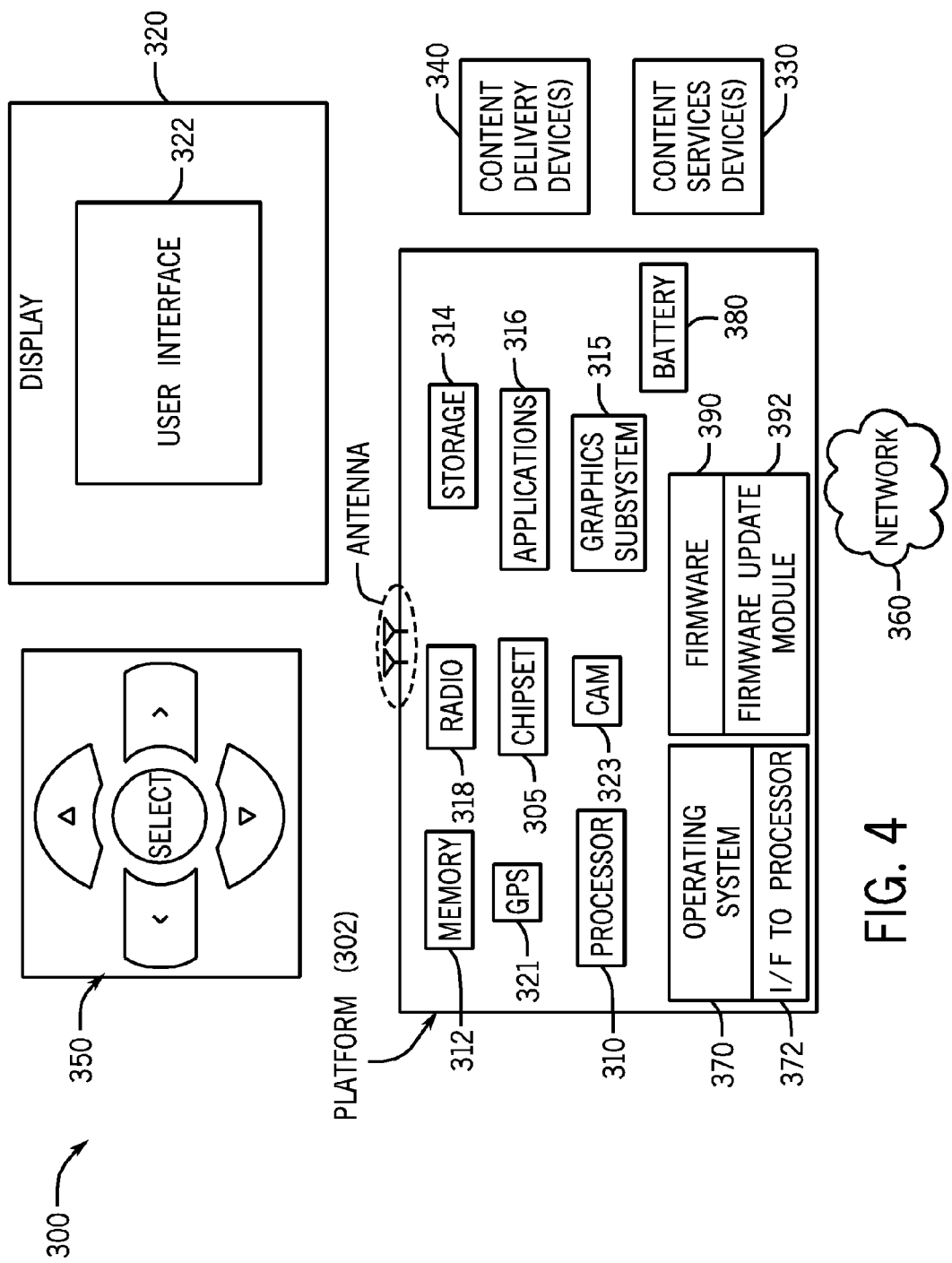
FIG. 4 is a schematic depiction of one embodiment to the present invention.

FIG. 4 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
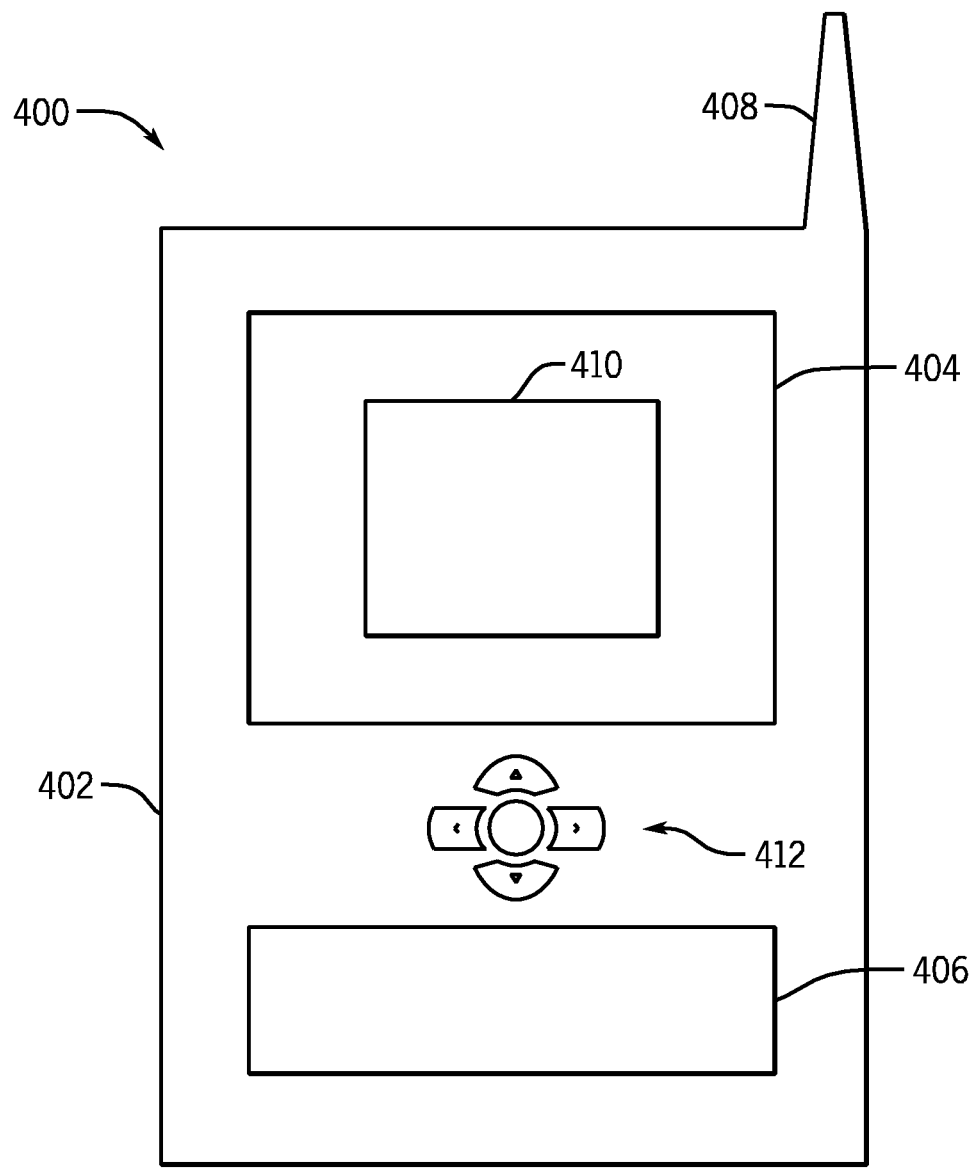
FIG. 5 is a front elevational view of one embodiment to the present invention.

As described above, system 300 may be embodied in varying physical styles or form factors. FIG. 5 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

A memory 312, coupled to the processor 310, may store computer readable instructions for implementing the sequences shown in FIGS. 1 to 3 in software and/or firmware embodiments.

As shown in FIG. 5, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer implemented method comprising:
   receiving a frame to be rendered, wherein the frame including a plurality of tiles;
   in a first pass in a graphics processor, for each tile of the frame, identifying primitives in the tile that are visible;
   recording identified visibility of primitives from the first pass as tile specific cull information;
   in a subsequent, second pass in the graphics processor, performing depth only rendering over the entire frame to generate entire frame cull information, wherein the entire frame cull information includes visibility information for all the primitives; and
   in a subsequent tile rendering pass, rendering the tiles using both the entire frame and the tile specific cull information to skip over non-visible primitives.

2. The method of claim 1 including using depth only rendering results to prevent unnecessary reprocessing of the primitives during the subsequent rendering pass.

3. The method of claim 1 including recording depth only rendering results at the primitive granularity.

4. The method of claim 1 including using tile based deferred rendering.

5. The method of claim 1 including using deferred rendering depth passes.

6. One or more non-transitory computer readable media storing instructions executed by a processor to perform a sequence comprising:
   receiving a frame to be rendered, wherein the frame including a plurality of tiles;
   in a first pass in a graphics processor, for each tile of the frame, identifying primitives in the tile that are visible;
   recording identified visibility of primitives from the first pass as tile specific cull information;
   in a subsequent, second pass in the graphics processor, performing depth only rendering over the entire frame to generate entire frame cull information, wherein the entire frame cull information includes visibility information for all the primitives; and
   in a subsequent tile rendering pass, rendering the tiles using both the entire frame and the tile specific cull information to skip over non-visible primitives.

7. The media of claim 6 further storing instructions to perform a sequence including using depth only rendering results to prevent unnecessary reprocessing of the primitives during the subsequent rendering pass.

8. The media of claim 6 further storing instructions to perform a sequence including recording depth only rendering results at the primitive granularity.

9. The media of claim 6 further storing instructions to perform a sequence including using tile based deferred rendering.

10. The media of claim 6 further storing instructions to perform a sequence including using deferred rendering depth passes.

11. An apparatus comprising:
    a graphics processor receives a frame to be rendered, wherein the frame including a plurality of tiles; in a first pass, for each tile of the frame, identifies primitives in the tile that are visible; record identified visibility of primitives from the first pass as tile specific cull information; in a subsequent, second pass performs depth only rendering over the entire frame to generate entire frame cull information in said second pass, wherein the entire frame cull information includes visibility information for all the primitives; and in a subsequent tile rendering pass, renders the tiles using both the entire frame and the tile specific cull information to skip over non-visible primitives; and a memory coupled to said graphics processor.

12. The apparatus of claim 11 said graphics processor to use depth only rendering results to prevent unnecessary reprocessing of the primitives during the subsequent rendering pass.

13. The apparatus of claim 11 said graphics processor to record depth only rendering results at the primitive granularity.

14. The apparatus of claim 11 said graphics processor to use tile based deferred rendering.

15. The apparatus of claim 11 said graphics processor to use deferred rendering depth passes.

16. The apparatus of claim 11 including an operating system.

17. The apparatus of claim 11 including a battery.

18. The apparatus of claim 11 including firmware and a module to update said firmware.

\* \* \* \* \*